(12) United States Patent
Meiners et al.

(10) Patent No.: US 6,534,740 B1
(45) Date of Patent: Mar. 18, 2003

(54) METHOD AND DEVICE FOR SCANNING THE SURFACE OF AN OBJECT WITH A LASER BEAM

(75) Inventors: Wilhelm Meiners, Aachen (DE); Konrad Wissenbach, Herzogenrath (DE); Andres Gasser, Aachen (DE)

(73) Assignee: Fraunhofer Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 09/762,434
(22) PCT Filed: Nov. 16, 1999
(86) PCT No.: PCT/DE99/03669
  § 371 (c)(1),
  (2), (4) Date: Feb. 8, 2001
(87) PCT Pub. No.: WO00/30802
  PCT Pub. Date: Jun. 2, 2000

(30) Foreign Application Priority Data

Nov. 23, 1998 (DE) .......................................... 198 53 979

(51) Int. Cl.$^7$ .............................................. B23K 26/00
(52) U.S. Cl. ............................ 219/121.65; 219/121.66; 219/121.8
(58) Field of Search ................ 219/121.65, 121.66, 219/121.78, 121.79, 121.8, 121.81

(56) References Cited

U.S. PATENT DOCUMENTS 5,298,717 A   3/1994  DeRossett, Jr.
5,985,204 A   11/1999 Otsuka
6,362,451 B1 * 3/2002  Karni et al. ............ 219/121.68

FOREIGN PATENT DOCUMENTS

DE      3445613 C1    7/1985
DE      94 21 149.3 U1 7/1995
DE      198 18 469 A1 10/1998

* cited by examiner

Primary Examiner—Samuel M. Heinrich
(74) Attorney, Agent, or Firm—Breiner & Breiner, L.L.C.

(57) ABSTRACT

The present invention relates to a device and a process using a laser beam to scan an area of an object, in particular, for selective laser melting of metal powder for fabrication of a mold. The device is provided with a plotter mechanic with two linear axes (4, 5) over which a carrier element can be positioned and moved, an optical means, which guides the laser beam to the carrier element or provides the laser beam at the carrier element, a scanning means (9) at the carrier element, which guides the laser beam to the area of the object and moves the laser beam back and forth in a presetable angle, a focusing optic (15) for focusing the laser beam (8) onto the area of the object (11). The plotter mechanic is disposed in such a manner that the plotter mechanic can position and move the carrier element at a distance over the area of the object (11), which distance permits the use of a focusing optic (15) of short focal length for focusing said laser beam to a diameter of <200 $\mu$m in the area of the object (11). This device combines the advantages of rapid movement of a focusing laser beam by using a scanner with the advantages of the size of the processing field being independent of the focal length of the focusing optic by using a plotter to move the beam.

14 Claims, 2 Drawing Sheets

METHOD AND DEVICE FOR SCANNING THE SURFACE OF AN OBJECT WITH A LASER BEAM

TECHNICAL FIELD

Figure 1:
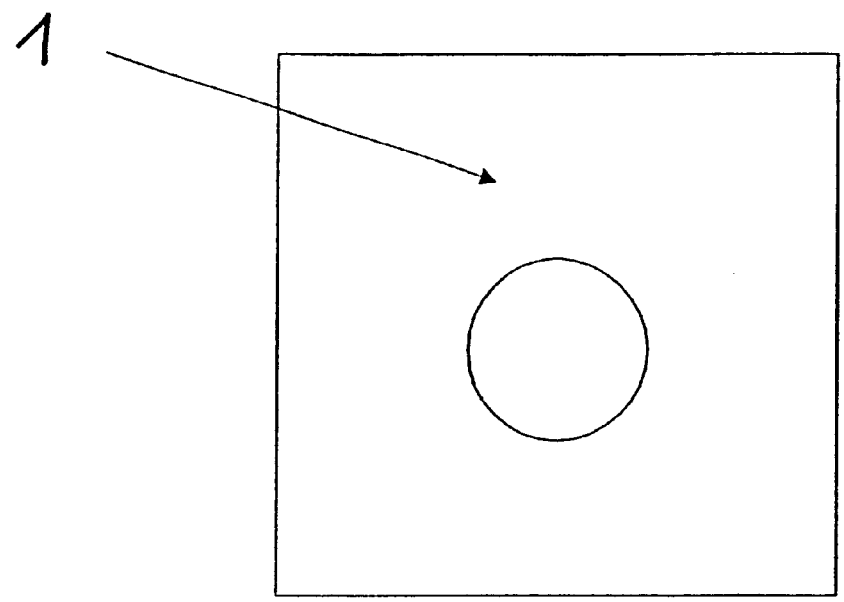
Figure 1:
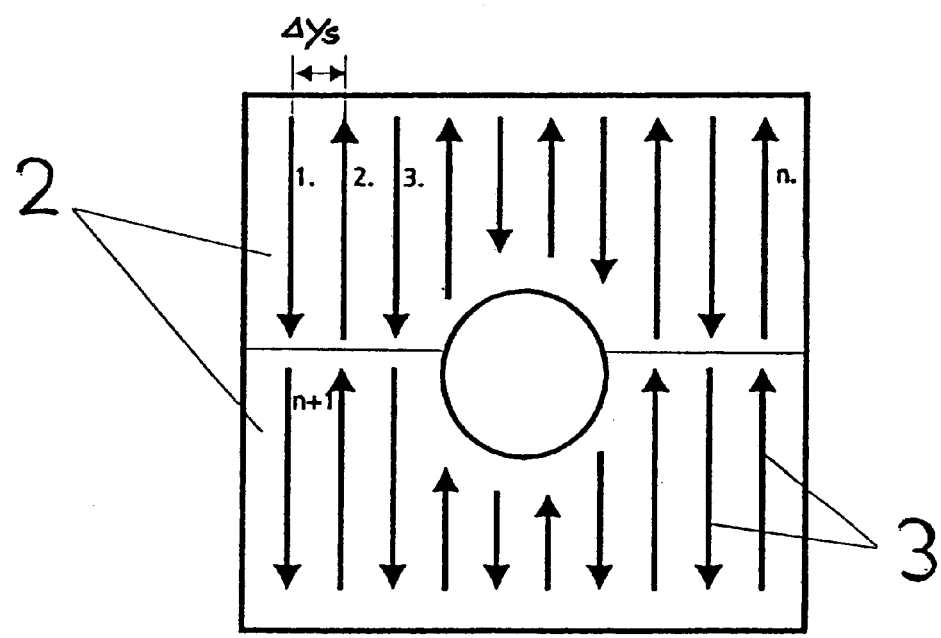

The present invention relates to a device and process using a laser beam to scan an area of an object, in particular for selective laser melting a metallic powder for fabricating a mold, for example, a prototype of a component.

The present invention relates predominantly to a technology referred to as rapid prototyping. Rapid prototyping processes are employed in product development to shorten product development time and increase product quality, which is made possible by the fact that with rapid prototyping processes prototypes can be quickly produced directly from the 3D CAD model, thereby obviating the hitherto required time-consuming creation of a NC program for milling, eroding or fabrication of form-giving tools.

The object of the development of new, respectively further development of present, rapid prototyping processes is to be able to process materials that are as close as possible to the series material or even identical to it. This especially applies to metallic prototypes or prototype tools. The known processes for selective laser melting permit fabricating components from commercial steels. These components are fabricated, as in all rapid prototyping processes, in layers. For this purpose, the material is applied in powder form as a thin layer onto a building platform. The powder is locally melted using a laser beam according to the configuration of the component of the to-be-processed layer. Steel components (e.g. stainless steel 1.4404) fabricated with this process attain, with regard to density and strength, the prescribed material specification. Thus, they can be used as function prototypes or directly as finished components.

STATE OF THE ART

DE 196 49 865 C1 proposes a process in which a metallic powder of a material containing no binding agent and no fluxing agent is applied to the building platform and is heated to the melting temperature by the laser beam according to the configuration of the component. The laser beam energy is selected in such a manner that the entire thickness of the layer of metallic powder of the material is completely melted where the laser beam impinges. In this process, the laser beam is led in several paths over the preset area of the respective layer of powder material in such a manner that each successive laser beam path partially overlaps the previous beam path. At the same time, a protective gas atmosphere is maintained over the interaction zone of the laser beam in order to prevent faults, which might be caused, for instance, by oxidation.

In the selective laser melting process, the focused laser beam scans the area of each layer belonging to the contour of the component line by line. The obtainable detail resolution and the surface quality of the produced parts depends decisively on the diameter of the focused laser beam.

Hitherto two fundamentally different technologies are known for moving a focused laser beam on a stationary processing plane.

Usually optical scanner systems are employed in rapid prototyping using a laser beam respectively a light beam. In the scanner system, positioning and moving the focused laser beam on the processing plane for each direction (x- and y-direction) occurs by turning a mirror respectively. The use of a scanner optic in a process for laser-beam sintering is, for example, schematically illustrated in the publication by Heinz Haferkamp et. al., Laserstrahl-Sintern zur Herstellung von Blechformwerkzeugen, in the journal "BLECH ROHRE PROFILE", 43 (1996) 6, pp. 317–319.

The disadvantage of scanner systems, however, is that if the preset turning angle of the mirror is maximum, the size of the workable area depends on the focal length of the focusing optic. The workable area can only be enlarged by means of a longer focal length. However, if all other optical elements are identical, increasing the focal length will also increase the focal diameter of the laser beam, thereby reducing the obtainable detail resolution and the quality of the surface of the produced parts.

From other areas of material processing with lasers, it is also known to use plotter systems. In a plotter system, the laser beam is guided along two linear axes. By suited movement of the axes, the laser beam can describe any path on the processing plane.

Using a plotter system has the advantage that the size of the workable area is only limited by the length of the employed linear axes. Moreover, a protective gas nozzle can be simultaneously moved along with the laser beam in a simple manner by coupling it to the linear axes.

However, the disadvantage of the plotter system is that, due to the mechanics involved, in comparison to a scanner system, only substantially lower processing velocities can be realized with a plotter system. In particular, processing velocities of >200 mm/s preferred for selective laser melting cannot be realized with sufficient accuracy with a plotter system.

A process for fabricating elongated components with diameters in the micro-range by means of laser melting, in which a stencil with elongated indentations according to the shape of the micro-parts, into which the metallic powder is filled, is employed is known from DE 34 45 613 C1. The laser beam is focused through the window of a high-vacuum chamber onto these indentations and the powder located therein is melted by a slow movement of the laser beam along the indentations. Subsequently, the melted material solidifies to a finished component. The respective device is provided with a scanner optic which can travel along a carrier arm parallel to the surface of the object. The purpose of a further linear axis is to set the distance of the scanner optic to the surface.

However, this printed publication does not relate to the field of so-called rapid prototyping but rather to the direct production of metallic micro-parts by means of a stencil employing very low processing velocities between 0.1 mm and 100 mm an hour.

The object of the present invention is to provide a device and a process using a laser beam to scan an area of an object, in particular, for selective laser melting permitting a sufficiently large processing area and a high processing velocity with a small focused laser beam diameter.

DESCRIPTION OF THE INVENTION

The object of the present invention is solved with the device according to claim 1 and the process according to claim 10. Advantageous embodiments of this device and this process are the subject matter of the subclaims.

A key element of the present invention is that, in selective laser melting or laser sintering, when impinging on the processing area, the diameter of the laser beam is smaller than the width of the to-be-melted area respectively to-bemelted structure. Consequently, it is necessary to guide the laser on several adjacent paths to cover the entire to-be-melted area.

An element of the present invention is that it was understood that, by suited division of this area respectively of the laser paths on the area, two varyingly fast systems can be used to guide the laser beam. While the laser beam can be moved back and forth with high velocity to scan small subsections by means of a scanner optic, such as is known from the state of the art, the entire scanner optic is moved further over the processing area with the aid of two linear axes to reach further subsections. Only a low velocity is required for this linear movement, which occurs largely transverse to the scanning direction of the scanner optic. The scanning movement of the scanner optic itself has to cover only a small area so that a focusing optic with a short focal length can be employed. Thus, the invented device provides a plotter system with two independent linear axes respectively linear drives on which, in addition, a scanner optic is provided.

The invented device, therefore, combines the advantages of the rapid movement of a focused laser beam by means of a scanner with the advantages of the size of the processing field being independent of the focal length of the focusing optic as a result of using a plotter to move the beam. Furthermore, this device permits, in a simple manner, guiding a protective gas nozzle along with it. The laser beam is preferably focused with a short-focal-length optic to a diameter of <200 µm and therefore simultaneously an area of any size can be worked with velocities of >200 mm/s.

In the invented process, the to-be-processed area is preferably divided into strip-shaped subsections (strips). Processing of the whole area by processing the individual occurs consecutively. The individual strips are processed by the laser beam being guided over the area inside a strip path by path, requiring a high laser beam velocity inside a path. The velocity with which the laser beam is moved from path to path is comparably lower.

A scanner is mounted on a plotter for moving the laser beam. The rapid movement of the laser beam inside a path is executed by the scanner. The movement of the laser beam from path to path and from strip to strip is executed by the plotter with the entire scanner being moved further along with the plotter.

As with this arrangement, the deflection of the laser beam by the scanner only occurs inside the respective strip, the maximum excursion of the laser beam by the scanner corresponds to the width of the strip. If a small strip width is selected (e.g. <5 mm), laser radiation can be focused with a short focal-length-focus optic (e.g. f<100 mm) onto a correspondingly small diameter (e.g. <200 µm). Suited selection of the strip width and the focusing optic also permits obtaining laser-beam-focal diameters of 10 µm) in the processing plane.

By mounting a protective gas nozzle on the plotter, the protective gas nozzle is moved along with the plotter motion. However, as the nozzle is only moved along with the plotter but does not follow the laser movement by means of the scanner, the width of the nozzle aperture is selected larger or the same size as the width of the strip, thereby ensuring that there is a continuous flow of protective gas in the interaction zone of the laser beam.

METHODS OF CARRYING OUT THE INVENTION

Figure 2:
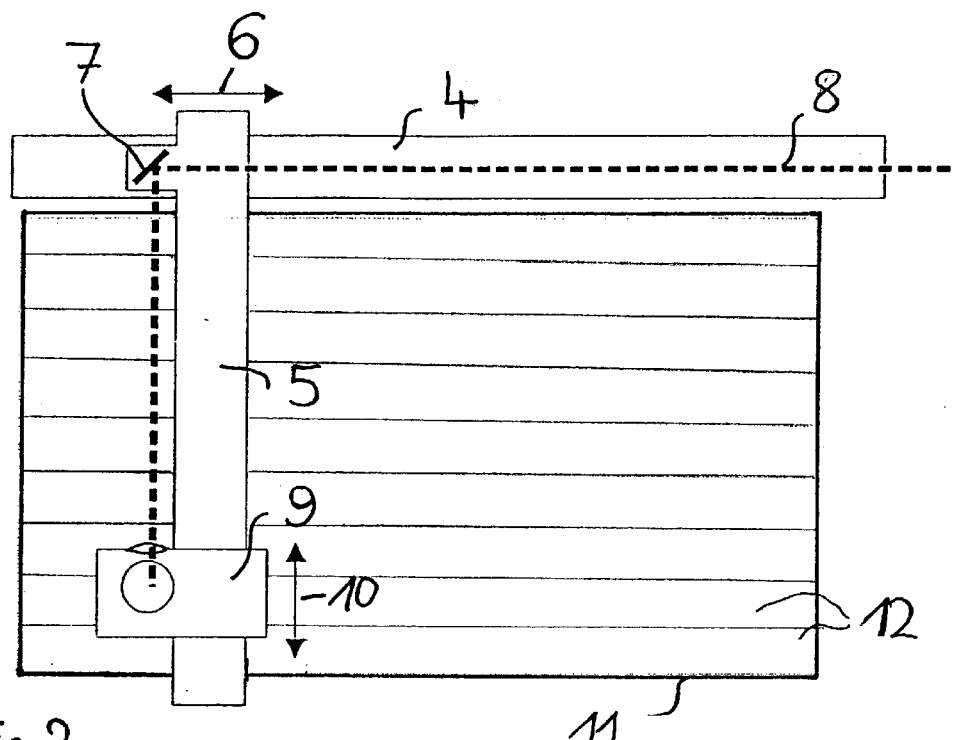

The present invention is made more apparent with reference to a preferred embodiment with the aid of the drawings, showing in FIG. 1 an embodiment of a division of a to-be-processed area into subsections;

FIG. 2 a schematic top view of an embodiment of the invented device; and

Figure 3:
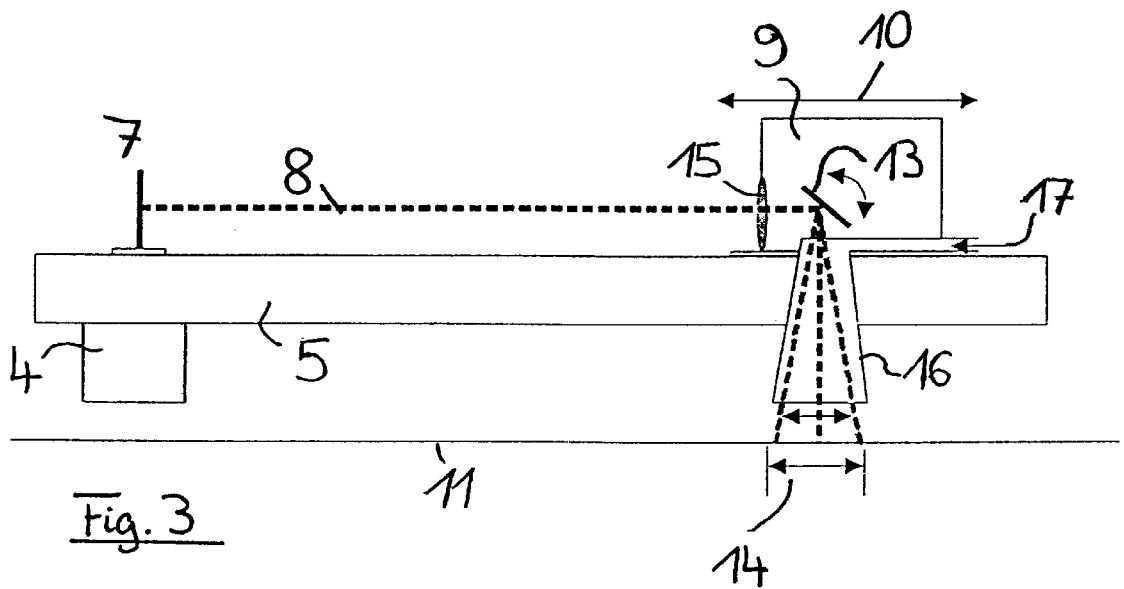

FIG. 3 a lateral view of the embodiment of FIG. 2.

The top part of FIG. 1 shows a to-be-processed entire area 1 of a component to be scanned by the laser beam. The to-be-processed area 1 is subdivided into strip-shaped subsections 2 as shown in a simplified manner with only 2 subsections in the lower part of the figure. A suited division into subsections can be carried out with the aid of data processing equipment, which operates the device. Processing the entire area occurs by the individual subsections being worked consecutively. In this manner, each subsection is covered path by path by the laser beam. Arrows 1, 2 . . . , n show the individual paths 3 and their scanning direction for processing the first subsection in FIG. 1. This path by path scanning is conducted with the aid of the scanner optic in such a manner that the high laser-beam velocity required for laser melting is maintained within each path 3. In comparison, the velocity with which the laser is moved from path to path is lower. This movement is generated via the plotter mechanics to which the scanner optic is attached. The plotter is also responsible for the movement of the laser beam from subsection to subsection, i.e. in the figure, from the end of path n of the first subsection to the beginning of path n+1 of the next subsection. The distance $\Delta y_s$ between the paths is preferably set in such a manner that, taking into consideration the diameter of the laser beam, the paths partially overlap in the processing plane.

The width of the individual strip-shaped subsections is selected in such a manner that a sufficiently small focal diameter of the laser beam is maintained over the entire width of each subsection during scanning. This must, of course, occur taking into consideration the focus optic employed.

FIG. 2 shows a schematic top view of an embodiment of the invented device. The device is composed of two linear axes 4 (x-axis) and 5 (y-axis) of a plotter mechanic. The linear axis 5 is moveable in the direction of the arrow (arrow 6) along the linear axis 4. In the region of the point of where the two axes intersect, a deviation mirror 7 is secured to the linear axis 5. This deviation mirror 7 deviates a laser beam 8 which impinges along linear axis 4 onto a carrier element, which is disposed on the linear axis and has a scanner system 9. This carrier element with the scanner system 9 is moveable along the y-axis 5 in the direction of the arrow (arrow 10). This scanner system can, for example, be provided with a galvanometer drive. Also depicted in the figure is the processing plane 11 which is subdivided into individual subsections 12. By shifting the linear axis 5 respectively along the linear axis 4 and moving the carrier element along the linear axis 5, each position of the processing area can be reached with the carrier element.

FIG. 3 shows a lateral view of the exemplary device. The same reference numbers are employed for the same elements as in FIG. 2. The rotatable deviation mirror 13 of the scanner system which directs the incident laser beam 8 from the deviation mirror 7 to the processing area 11 can be seen in the figure. The reachable angle of the deviation of the laser beam by turning the mirror 13 is indicated schematically by three beam courses. In most applications, this angle lies between 1° and 15° for the entire scanning area. This angle realizes a scanning width on the processing area, which corresponds to the strip width 14 of the subsections 12.

The figure also shows the focusing lens 15 in front of the scanning system, with which the laser beam is focused onto the processing area. Of course, other focusing optics are possible in front of and behind the deviation mirror 13.

FIG. 3 also shows a protective gas nozzle 16, which is attached at the carrier element. During processing, a protective gas 17 is led via this protective gas nozzle onto the interaction zone. In the present embodiment, the protective gas nozzle is designed in such a manner that the width of its outlet opening corresponds to the width 14 of the subsections 12. Therefore, it is ensured that a protective gas flow is constantly present in the interaction zone of the laser beam.

In another, not depicted embodiment, the scanner optic comprises, in addition to the mirror 13, a second deviation mirror in the beam path of the laser which permits scanning perpendicular to the scanning direction generated with the mirror 13. With such a preferred embodiment, after scanning the subsections of a component layer in a first scanning direction preset by the deviation mirror 13, the adjacent paths of the subsections of the next component layer can be selected perpendicular to those of the just scanned component layer by using the second mirror. This is advantageous for the sturdiness of the component.

With the invented device, a processing area of >300×300 mm² can be processed in a simple manner with a focused laser beam diameter of <200 μm at a velocity of >200 mm/s. Of course, a lower scanning velocity, for example of 50 mm/s, can also be utilized.

The invented device can be used particularly advantageously in connection with selective laser melting equipment like the one described in DE 196 49 865 C1.

What is claimed is:

1. A device using a laser beam to scan an area of an object comprising
    a plotter mechanism with two linear axes for positioning and moving a carrier element over said area of said object,
    a focusing optic at said carrier element for focusing said laser beam on said area of said object,
    an optical means, which guides said laser beam to said carrier element or provides said laser beam at said carrier element, and
    a scanning means at said carrier element, which guides said laser beam to said area of said object and moves said laser beam back and forth in a presettable angle,
wherein said plotter mechanism being disposed in such a manner that said plotter can position and move said carrier element at a distance over said area of said object, which distance permits use of a focusing optic of short focal length for focusing said laser beam to a diameter of <200 μm in said area of said object.

2. A device according to claim 1, wherein said scanning means comprises a deviation element which is rotatable about a first axis in a beam path of said laser beam.

3. A device according to claim 2, wherein said scanning means comprises an additional deviation element rotatable about a second axis in said beam path of said laser beam, with said first and said second axis standing perpendicular to each other.

4. A device according to one of claims 1 to 3, wherein the presettable angle lies between 1° and 15°.

5. A device according to claim 1 wherein said optical means comprises a fiber-optical light guide, which is secured with one end to said carrier element.

6. A device according to claim 1 wherein said optical means comprises at least one deviation element, which is secured on one of said linear axes.

7. A device according to claim 1 wherein said optical means being provided with a laser beam source which is secured on said carrier element.

8. A device according to claim 1 wherein a gas nozzle having an outlet opening via which a protective gas can be directed at a region of said area of said object lying within the presettable angle of said laser beam being provided on said carrier element.

9. A device according to claim 8, wherein said outlet opening being wider than said region of said area of said object lying within said presettable angle of said laser beam.

10. A process using a laser beam to scan an area of an object, comprising dividing said area of said object onto individual subsections and said individual subsections are scanned in adjacent paths with a laser beam, with movement of said laser beam on each of said adjacent paths being executed by a scanner optic and said movement of said laser beam from path to path and from subsection to subsection being executed by a plotter mechanism carrying said scanner.

11. A process according to claim 10, wherein narrow strips being selected as said subsections.

12. A process according to claim 10 or 11 for selective laser melting, with said area of said object corresponding to one component plane of a component wherein after scanning a component plane, said adjacent paths of said subsections of the next component plane being selected perpendicular to those of a just scanned component plane.

13. A device according to claim 4 wherein a gas nozzle having an outlet opening via which a protective gas can be directed at a region of said area of said object lying within the presettable angle of said laser beam being provided on said carrier element.

14. A device according to claim 13, wherein said outlet opening being wider than said region of said area of said object lying within said presettable angle of said laser beam.

\* \* \* \* \*

UNITED STATES PATENT AND TRADEMARK OFFICE
CERTIFICATE OF CORRECTION

PATENT NO. : 6,534,740 B1 Page 1 of 1
DATED : March 18, 2003
INVENTOR(S) : Wilhelm Meiners et al.

It is certified that error appears in the above-identified patent and that said Letters Patent is hereby corrected as shown below:

Column 5,
Line 48, "said plotter" should read -- said plotter mechanism --.

Column 6,
Line 28, "object onto" should read -- object into --.

Signed and Sealed this

Twenty-second Day of July, 2003

JAMES E. ROGAN
*Director of the United States Patent and Trademark Office*